United States Patent [19]
Jin et al.

[11] Patent Number: 6,154,590
[45] Date of Patent: Nov. 28, 2000

[54] WAVELENGTH-TUNABLE DEVICES AND SYSTEMS COMPRISING FLEXED OPTICAL GRATINGS

[75] Inventors: Sungho Jin, Millington; Hareesh Mavoori, Berkeley Heights, both of N.J.

[73] Assignee: Lucent Technologies Inc., Murray Hill, N.J.

[21] Appl. No.: 09/162,325

[22] Filed: Sep. 28, 1998

[51] Int. Cl.[7] ....................................... G02B 6/34
[52] U.S. Cl. ................... 385/37; 385/16; 385/19; 372/20; 359/130; 359/341
[58] Field of Search .................. 385/37, 6, 12, 385/19, 16, 31, 137; 372/20, 64; 359/115, 124, 130, 341

[56] References Cited

U.S. PATENT DOCUMENTS 5,999,546  12/1999  Espindola et al. .................. 372/20
6,055,348   4/2000  Jin et al. .......................... 385/37

*Primary Examiner*—Phan T. H. Palmer
*Attorney, Agent, or Firm*—Mathews, Collins, Shepherd & Gould, P.A.

[57] ABSTRACT

In accordance with the invention, a tunable optical grating device comprises a grating, which is fixed at both ends to a support frame and is flexed so that a tensile strain induced in the grating reconfigures the resonant wavelength. Typical embodiments include mechanical or magnetic latching arrangements capable of inducing a latchable change in grating periodicity. In typical embodiments programmable and latchable magnets accurately produce a predetermined amount of fiber deflection and tensile strain, thereby producing a latchable wavelength shift with minimal power. The device is especially useful in WDM communication systems for adding or dropping channels, for dynamically gain-equalizing optical amplifiers, for tuning lasers, and for dispersion compensation.

18 Claims, 8 Drawing Sheets

WAVELENGTH-TUNABLE DEVICES AND SYSTEMS COMPRISING FLEXED OPTICAL GRATINGS

FIELD OF THE INVENTION

The present invention relates to wavelength-tunable optical grating devices and to communication systems using them. In particular, it concerns devices and systems including optical fiber gratings the wavelength of which can be tuned and latched to a preset value by flexing.

BACKGROUND OF THE INVENTION

Optical fiber gratings are key components in modern telecommunication systems. Basically, optical fibers are thin strands of glass capable of transmitting an optical signal containing a large amount of information over long distances with very low loss. They are small diameter waveguides comprising a core having a first index of refraction surrounded by a cladding having a second (lower) index of refraction. Typical optical fibers are made of high purity silica with minor concentrations of dopants to control the index of refraction.

Optical fiber gratings are important elements for selectively controlling specific wavelengths of light within optical fibers. Optical fiber gratings include Bragg gratings, long period gratings and diffraction gratings. Such gratings typically comprise a body of material and a plurality of substantially equally spaced optical grating elements such as index perturbations, slits or grooves.

A typical Bragg grating comprises a length of optical fiber, including a plurality of index perturbations substantially equally spaced along the length. These perturbations selectively reflect light of wavelength $\lambda$ equal to twice the spacing $\Lambda$ between successive perturbations times the effective refractive index neff, i.e. $\lambda = 2n_{eff}\Lambda$, where $\lambda$ is the vacuum wavelength. The remaining wavelengths pass essentially unimpeded. Such Bragg gratings have found use in a variety of applications including filtering, adding and dropping signal channels, stabilization of lasers, reflection of fiber amplifier pump energy, and compensation for waveguide dispersion.

Waveguide Bragg gratings are conveniently fabricated by doping a waveguide core with one or more dopants sensitive to ultraviolet light, e.g., germanium or phosphorous, and exposing the waveguide at spatially periodic intervals to a high intensity ultraviolet light source, such as an excimer laser. The ultraviolet light interacts with the photosensitive dopant to produce long-term perturbations in the local index of refraction. The appropriate periodic spacing of perturbations can be obtained by use of a physical mask, a phase mask, or a pair of interfering beams.

A difficulty with conventional Bragg gratings is that they filter only a fixed wavelength. Each grating selectively reflects only light in a narrow bandwidth centered around $\lambda = 2n_{eff}\Lambda$. However in many applications, such as wavelength division multiplexing (WDM), it is desirable to have a reconfigurable grating whose wavelength response can be controllably altered.

One attempt to make a tunable Bragg grating uses a piezoelectric element to strain the grating. See Quetel et al., 1996 Technical Digest Series, Conf on Optical Fiber Communication, San Jose, Calif., Feb. 25–Mar. 1, 1996, Vol. 2, p. 120, Paper No. WF6. The difficulty with this approach is that the strain produced by piezoelectric actuation is relatively small, limiting the tuning range of the device. Moreover, it requires a continuous application of electrical power with relatively high voltage of approximately 100 volts.

The second kind of fiber grating is the long period fiber grating. Long-period gratings provide wavelength dependent loss and may be used for spectral shaping. A long-period grating couples optical power between two co-propagating modes with very low back reflections. It typically comprises a length of optical waveguide wherein a plurality of refractive index perturbations are spaced by a periodic distance $\Lambda'$ which is large compared to the wavelength $\lambda$ of the transmitted light. In contrast with Bragg gratings, long-period gratings use a periodic spacing $\Lambda'$ which is typically at least 10 times larger than the transmitted wavelength, i.e. $\Lambda' \geq 10\lambda$. Typically $\Lambda'$ is in the range 15–1500 micrometers, and the width of a perturbation is in the range $\frac{1}{5}\Lambda'$ to $\frac{4}{5}\Lambda'$. In some applications, such as chirped gratings, the spacing $\Lambda'$ can vary along the length of the grating.

Long-period fiber grating devices selectively remove light at specific wavelengths by mode conversion. In contrast with Bragg gratings in which light is reflected and stays in the waveguide core, long-period gratings remove light without reflection, as by converting it from a guided mode to a non-guided mode. (A non-guided mode is a mode which is not confined to the core, but rather, is defined by the entire waveguide structure. Often, it is a cladding mode). The spacing $\Lambda'$ of the perturbations is chosen to shift transmitted light in the region of a selected peak wavelength $\lambda_p$ from a guided mode into a nonguided mode, thereby reducing in intensity a band of light centered about the peak wavelength $\lambda_p$. Alternatively, the spacing $\Lambda'$ can be chosen to shift light from one guided mode to a second guided mode (typically a higher order mode), which is substantially stripped off the fiber to provide a wavelength dependent loss. Such devices are particularly useful for equalizing amplifier gain at different wavelengths.

A difficulty with conventional long-period gratings is that their ability to dynamically equalize amplifier gain is limited because they filter only a fixed wavelength. Each long-period grating with a given periodicity ($\Lambda'$) selectively filters light in a narrow bandwidth centered around the peak wavelength of coupling, $\lambda_p$. This wavelength is determined by $\lambda_p = (n_g - n_{ng}) \cdot \Lambda'$, where $n_g$ and $n_{ng}$ are the effective indices of the core and the cladding modes, respectively. The value of $n_g$ is dependent on the core and cladding refractive index while $n_{ng}$ is dependent on core, cladding and air indices.

In the future, multi-wavelength communication systems will require reconfiguration and reallocation of wavelengths among the various nodes of a network depending on user requirements. This reconfiguration will impact upon the gain of the optical amplifier. As the number of channels passing through the amplifier changes, the amplifier will show deleterious peaks in its gain spectrum, requiring modification of the long-period grating used to flatten the amplifier. Modifying the long-period grating implies altering either the center wavelength of the transmission spectrum or the depth of the coupling.

Thus, there is a need for tunable long-period gratings whose transmission spectra can be controlled as a function of the number of channels and power levels transmitted through an amplifier. It is desirable to have tunable long-period gratings which, upon activation, can be made to dynamically filter other wavelengths (i.e., besides $\lambda_p$). It is also desirable to be able to selectively filter a broad range of wavelengths. Further, tunable long period gratings can be useful for suppressing amplifier spontaneous emission (ASE), and can also be used as tunable loss elements for filtering out undesirable remanent signals from communication channel ADD/DROP operations.

Diffraction gratings typically comprise reflective surfaces containing a large number of parallel etched lines of substantially equal spacing. Light reflected from the grating at a given angle has different spectral content dependent on the spacing. The spacing in conventional diffraction gratings, and hence the spectral content, is generally fixed.

In view of the foregoing, it can be seen that there is a need for tunable optical gratings including Bragg gratings, long-period gratings and diffraction gratings whose wavelengths can be latchably reconfigured.

SUMMARY OF THE INVENTION

In accordance with the invention, a tunable optical grating device comprises a grating, which is fixed at both ends to a support frame and is flexed so that a tensile strain induced in the grating reconfigures the resonant wavelength. Typical embodiments include mechanical or magnetic latching arrangements capable of inducing a latchable change in grating periodicity. In typical embodiments programmable and latchable magnets accurately produce a predetermined amount of fiber deflection and tensile strain, thereby producing a latchable wavelength shift with minimal power. The device is especially useful in WDM communication systems for adding or dropping channels, for dynamically gain-equalizing optical amplifiers, for tuning lasers, and for dispersion compensation.

BRIEF DESCRIPTION OF THE DRAWINGS

The advantages, nature and additional features of the invention will appear more fully upon consideration of the illustrative embodiments described in the accompanying drawings. In the drawings.

It is to be understood that these drawings are for purposes of illustrating the concepts of the invention and are not to scale. The same reference numerals are used to designate similar elements throughout the drawings.

DETAILED DESCRIPTION

Figure 1A:
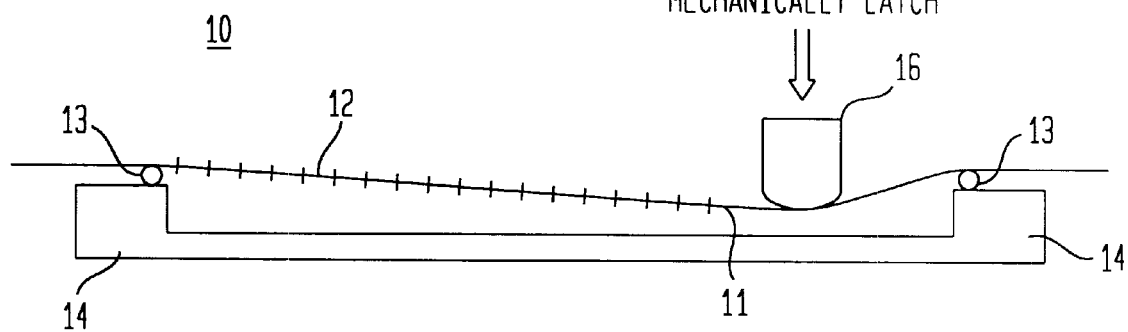
FIGS. 1(a) and (b) schematically illustrate exemplary wavelength-tunable fiber grating devices.

Referring to the drawings, FIG. 1(a) schematically illustrates an exemplary wavelength-tunable fiber grating device 10 comprising a length of optical fiber 11 including a grating 12 of index perturbations. The fiber is attached at opposite ends to a support frame 14 by mechanical attachments or bonds 13. The optical fiber grating 12 can be a Bragg grating having a desired Bragg reflection wavelength for dropping or adding a wavelength component. For example, for a median light beam wavelength of 1550 nm, the Bragg grating periodicity $\Lambda$ in a $SiO_2$ based fiber (with a refractive index n~1.45) is about 500 nm. The length of each optical fiber grating to be incorporated into the grating assembly is typically in the range of 5 mm to 200 mm and preferably in the range of 10–100 mm. For a short fiber grating, the region of the regular fiber outside the grating can be used for attachment to either the magnetic components or the support frame. Alternatively, the grating 12 can be a long period grating with a periodicity for a desired peak wavelength of coupling, $\lambda_p$.

A movable body 16 is provided for laterally pressing the fiber grating down (or pulling it up), preferably slightly outside the active grating region 12. (Laterally means substantialy perpendicular to the axial direction of the fiber.) The pressing or pulling induces a tensile strain in the grating, and alters the resonant wavelength (e.g., the Bragg reflection wavelength in Bragg-type gratings, or the peak-coupling wavelength in long-period type gratings). It is preferred that the induced strain and the wavelength shift are latchable.

In operation of the FIG. 1(a) device, the fiber flexing moving body can be mechanically pressed, e.g., by motor-driven force, pneumatic force, actuated weight, or hydraulic pressure, to a desired extent, and mechanically latched, by a spring latch, stepper motor, or lock-in notches. If a simple operation in a wavelength bistable mode is desired, the moving body is either completely pressed against the support frame to obtain a fixed fiber strain, or released completely so that the fiber is not strained at all, thus providing two fixed levels of grating wavelength.

Figure 1B:
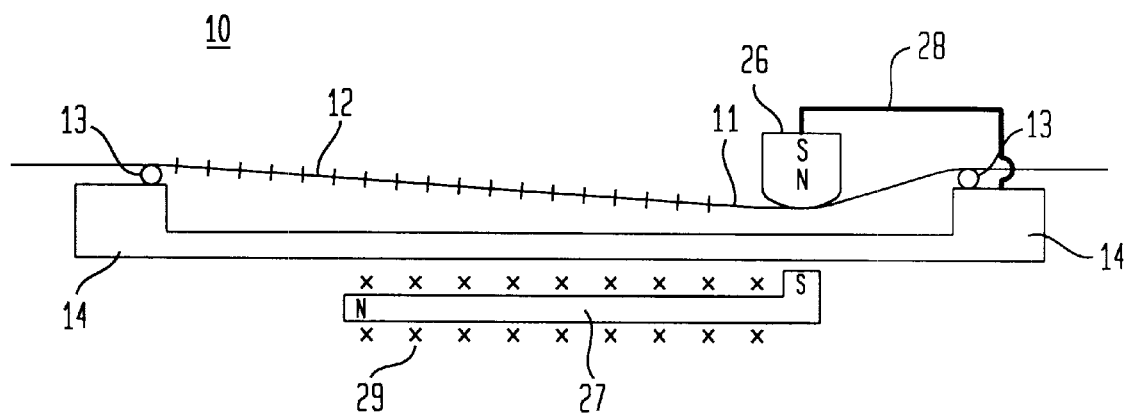

FIG. 1(b) shows a modification of the FIG. 1(a) device wherein the movable body is magnetically pressed or pulled. Here the body is a movable magnet 26. A programmable magnet 27 is provided for moving magnet 26 to flex the grating 12. Advantageously magnet 26 is connected to the support frame 14 by a spring arm 28.

The programmable magnet 27 is preferably latchable and its magnetic strength is controlled by the electrical current applied to a surrounding solenoid 29. By altering the electrical current in the solenoid, the magnetic field is altered. This alters the level of latched magnetization (M) in the programmable magnet 27 after the field is removed and latches the fiber strain ($\epsilon$). Thus the resonant wavelength of the grating 12 can be latched at different values.

The moving magnet 26 is soft, semi-hard or hard, depending on the specific design. For a simple operation in a bistable wavelength mode, the movable magnet 26 is either completely attracted to the programmable magnet for maximum fiber strain and the wavelength increase, or is completely released (or released to a certain fixed-gap position defined by a constraining stop).

For wavelength channel ADD/DROP operation in dense WDM systems, it is sometimes desirable to place the fiber Bragg grating filter at the between-channel position and operate with a fixed $\Delta\lambda$ shift (e.g., by one-half the channel spacing to the nearest optical signal) to activate or deactivate the filter. The bistable mode operation of the devices in FIG.

1 can be useful for such an application. Alternatively, the devices in FIGS. 1(a) and (b) can be actuated and latched at any intermediate position of the moving body or the movable magnet so that any desired, intermediate grating wavelength can be latchably obtained.

The force transmitted from the movable magnet to the grating produces a strain which changes the wavelength response of the grating. The force between two attracting magnets is approximately proportional to the square of the magnetic induction (M) multiplied by the cross-sectional area (A) of the magnets at the gap (F∝$M^2$·A). Thus stronger magnets (higher M) or larger magnets (larger A) give stronger force. But strong magnets with high coercivity are difficult to magnetically switch. When the fiber grating is stretched or compressed, e.g., 1% in length ($\epsilon = \Delta l/l = 0.01$), the grating periodicity $\Lambda$ will also change. However, the resonating Bragg reflection wavelength $\lambda$ will not change by exactly 1%, since the interatomic distance in the glass is also affected by the elastic strain and as a result the refractive index n is altered. This strain effect on the refractive index can be represented by a photoelastic constant $P_\epsilon$ which is typically about 0.22 for the $SiO_2$ fiber. The wavelength change induced by the magnetically applied strain $\epsilon$ ($\epsilon = \Delta l/l$) is thus expressed as $\Delta\lambda/\lambda = (\Delta l/l)(1-P_\epsilon) = \epsilon(1-P_\epsilon)$. The strain $\epsilon$ is determined by the applied stress ($\sigma$) and the elastic modulus (E), $\epsilon = \sigma/E$, and the stress on the fiber is the force (F) divided by the cross-sectional area ($\pi r^2$) where r is the radius of the fiber grating.

Since optical fiber tends to break at a tensile strain of about 6%, and since such a failure would be disastrous, it is highly desirable to have a tunable grating design that automatically provides an upper limit in total tensile strain. The assembly configurations of FIGS. 1(a) and 1(b) offer such an advantage because the pre-set gap between the unstrained fiber and the support frame serves as the upper limit for the extent of fiber flexing and tensile elongation of the fiber. The desired amount of the gap (the upper limit in vertical flexing of the fiber) is typically less than about 10% of the fiber length being stretched (with the corresponding maximum strain in the fiber grating of less than about 2%), and preferably less than 5% of the length of the grating-containing fiber. For example, for a 2 inch long grating, the vertical gap is typically set below about 200 mil and preferably below ~100 mil.

Figure 2A:
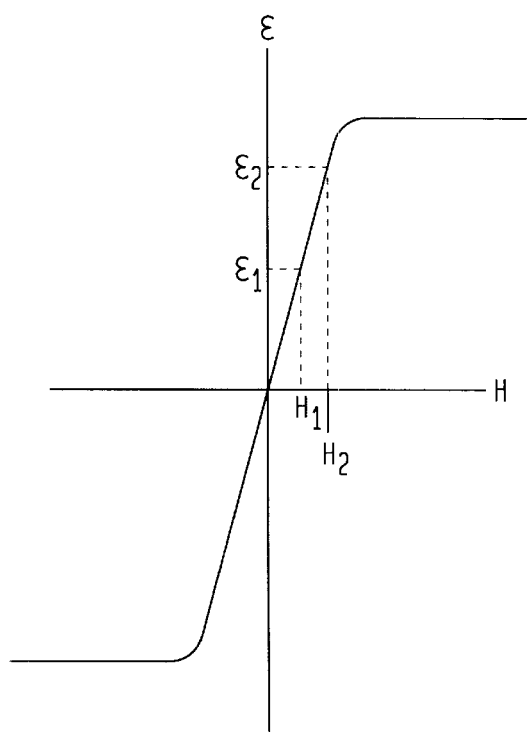
FIGS. 2(a) and 2(b), respectively, illustrate non-latchable and latchable strain induced by magnetic actuation.
Figure 2B:
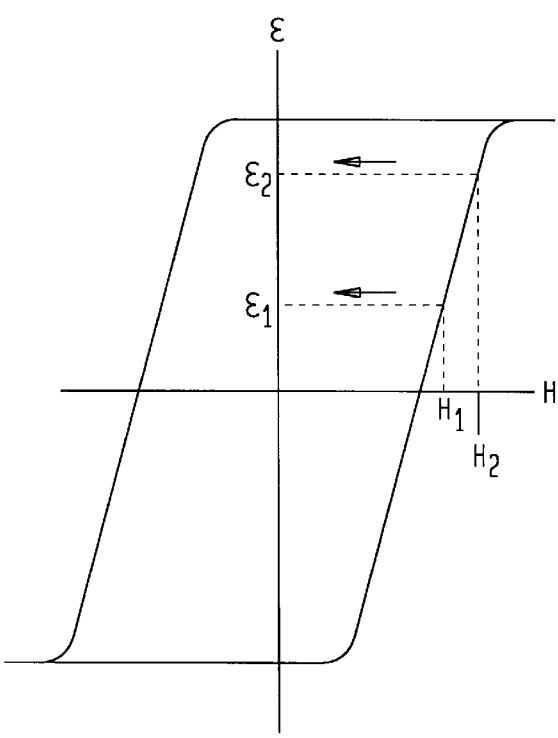

FIGS. 2(a) and 2(b) are schematic graphical illustrations useful in understanding the operation of the programmable magnet 27. FIG. 2(a) illustrates the relation between magnetization (H) and strain for a nonlatchable magnet. The preferred materials for the programmable magnet are those whose magnetic properties are modifiable by a pulse magnetic field. They can be magnetically soft materials with very low coercivity (e.g., below ~10 Oe) such as Ni—Fe based permalloys, Fe—Co based permendur type alloys, or Si-steels. However, for a latchability of shifted wavelength without a continuous use of power, semi-hard magnetic materials are preferred, for example, low-coercivity (e.g. below ~200 Oe) Fe—Cr—Co, Fe—Al—Ni—Co (Alnico), Cu—Ni—Fe (Cunife), Co—Fe—V (Vicalloy), Fe—Mn, Fe—Mn—Ni, Fe—Mo—Ni.

FIG. 2(b) illustrates the relation between magnetization and strain for a latchable magnet. The desired range of the coercivity for the semi-hard magnet is typically below 500 Oe and preferably below 100 Oe for the ease of polarity switching using solenoid pulse field. The coercivity is typically above 10 Oe and preferably above 30 Oe for maintaining the stability of the remanent magnetization and also for stability against demagnetization due to stray magnetic fields. For the semi-hard magnetic materials it is desirable that the switchable magnet have a relatively square magnetization hysteresis loop with the squareness ratio (remanent magnetization/saturation magnetization) of at least 0.85, preferably at least 0.90, even more preferably at least 0.95 as schematically illustrated in FIG. 2(b). Mechanically ductile and easily formable or machineable magnet alloys such as Fe—Cr—Co, Cu—Ni—Fe, Co—Fe—V are particularly desirable for shaping into desired rod-like geometry shown in FIG. 1. Stable permanent magnets with high coercive forces (e.g., $H_c$>1000 Oe), such as Sm—Co, Nd—Fe—B or Ba-ferrite are less desirable as the programmable magnet (unless modified to exhibit lower coercive forces) because of the difficulty in switching using desirably low magnetic field.

The programmable magnet 27 is operated by adding at least one solenoid winding 29 around it and applying a programmed pulse or a short-duration field to switch the polarity or alter the magnitude of magnetization in the magnet. This adjustment alters the force and the strain on the fiber grating, and hence optical signal wavelength (or amplitude in the case of long period grating). The desired duration or speed of the pulse field is typically in the range of $10$–$10^{-6}$ seconds and preferably $10^{-1}$–$10^{-4}$ seconds. For a thick magnet geometry, the use of fast pulses is not desirable because of the eddy current loss. The shape of the current pulse can be rectangular, rectified sinusoidal or irregular as long as the maximum field needed for the desired magnetic switching is achieved.

Figure 3A:
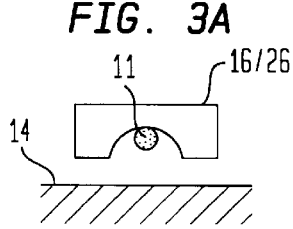
FIGS. 3(a)–(f) schematically illustrate exemplary cross-sectional shapes of fiber-deflecting movable bodies.
Figure 3B:
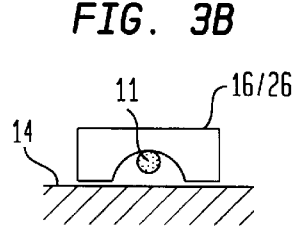
Figure 3C:
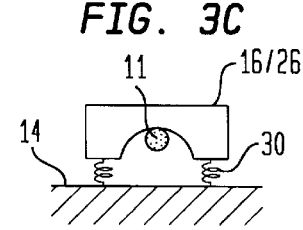
Figure 3D:
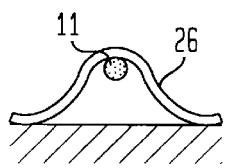
Figure 3E:
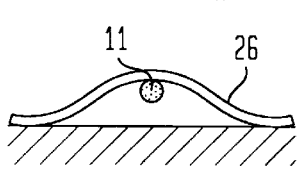
Figure 3F:
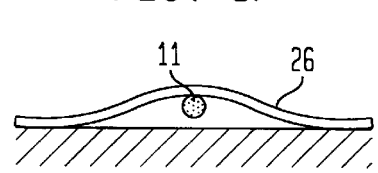

FIGS. 3(a)–3(f) illustrate various alternative configurations of the fiber-flexing moving body 16 or the movable magnet 26. FIGS. 3(a) and 3(b) show two different positions of the body/magnet 16/26. FIG. 3(c) shows additional mechanical springs 30 is added to provide additional flexibility and reversibility in the fiber straining control. And FIGS. 3(d), 3(e), and 3(f) show a movable spring-like magnet 26 which can be elastically elastically deformed by the programmable magnet 27.

Figure 4:
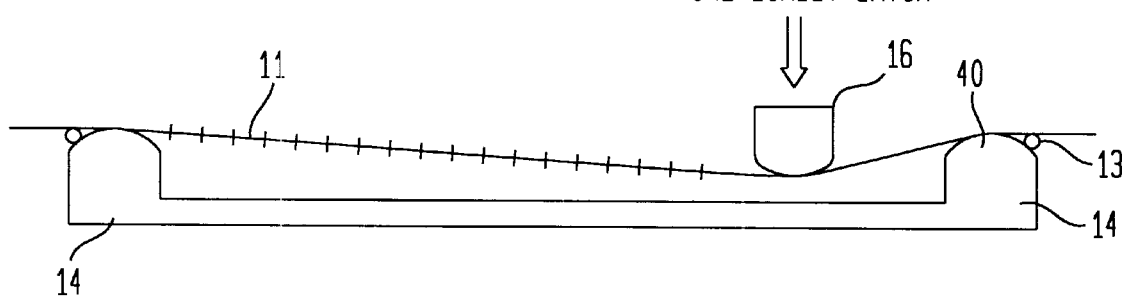
FIG. 4 schematically show a curved support frame to minimize severe fiber bending near the bond area.

FIG. 4 illustrates an advantageous fiber bonding configuration. Since a sharp (small curvature) bending of an optical fiber or a grating is not desirable, it is advantageous to minimize such a deformation when the fiber is flexed. One convenient way of achieving such a goal is to utilize rounded posts 40 in the support frame 14 and place the fiber-to-frame bonding 13 slightly outside the peak of the rounded post as illustrated in FIG. 4. When the fiber is flexed, the gentle curvature of the post allows a smooth transition in fiber bending, and prevents the undesirable sharp bending of the fiber. Low-friction coating materials such as teflon or diamond-like-carbon may be applied on the surface of the moving body or the curvatured post to reduce possible friction-related problems after repeated fiber flexing operations.

Figure 5A:
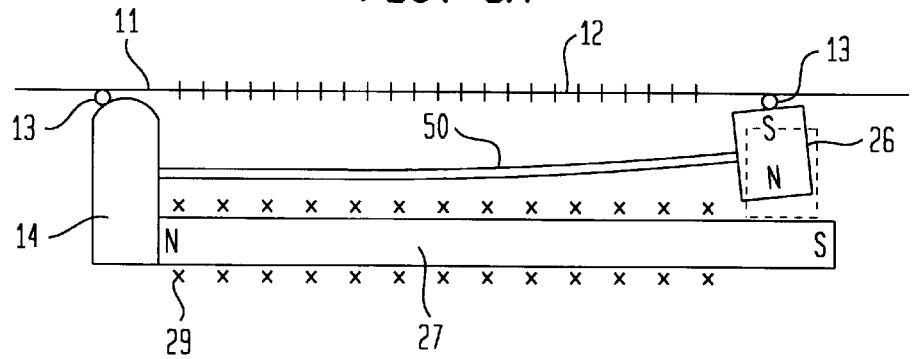
FIGS. 5(a)–(c) schematically illustrate alternative tunable grating devices.
Figure 5B:
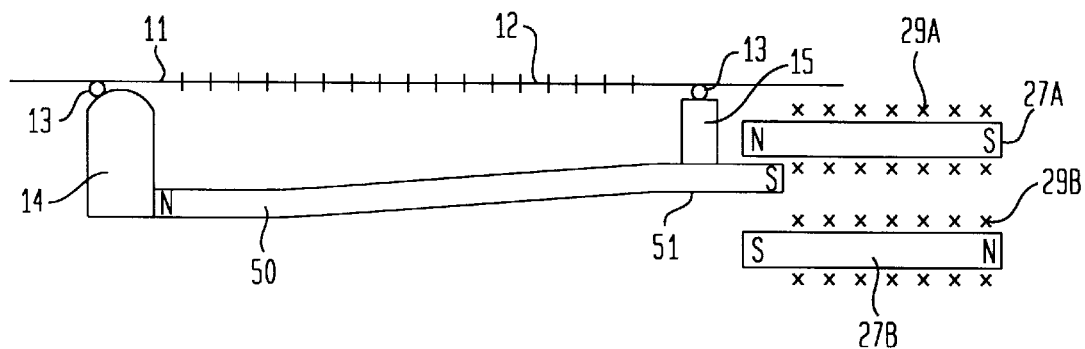
Figure 5C:
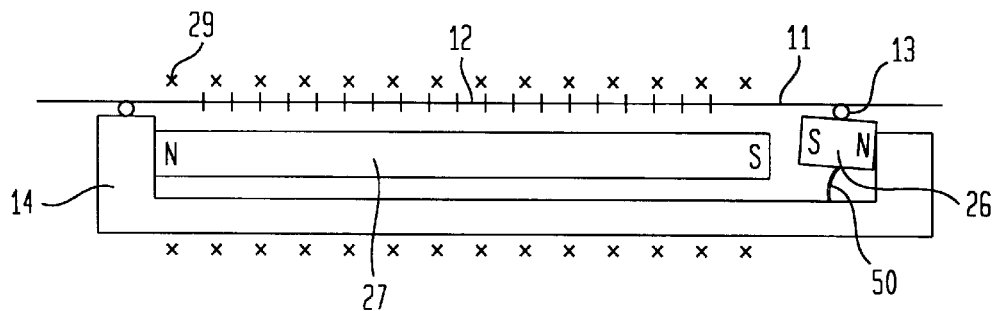

FIGS. 5(a)–5(c) illustrate additional alternative embodiments of tunable gratings. In FIG. 5(a), the movable magnet 26 is attached to the end of a leaf spring 50. As the programmable and latchable magnet 27 placed near the spring 50 and the movable magnet 26 is actuated by solenoid 27. The movable magnet 26 moves down by magnetic attraction or moves up by magnetic repulsion depending on the relative magnetization polarity and magnitude. Thus any intermediate position can be latchably obtained. The grating-containing fiber 11 which is attached to the movable magnet is then elastically flexed and strained. The movable magnet 26 can be made of a permanent magnet material such as Nd—Fe—B, Sm—Co, Al—Ni—Co, Fe—Cr—Co. Alternatively, the movable magnet can be made of a soft magnetic material such as Ni—Fe permalloy or Si-steel, and the retractive force can then be provided by using a mechanical spring force instead of magnetic repulsion. A stop (not shown) placed above the movable magnet can impose an upper limit in the fiber strain and hence the wavelength shift. The device with a stop can also be operated as a bistable wavelength shifting device, for example, as a between-channel ADD/DROP filter in dense WDM optical communication systems.

In the FIG. 5(b) embodiment, the end 51 of a spring 50 is either itself made of magnetic material or has a magnet attached. The magnetic end 51 is placed between two programmable and latchable magnets 27A, 27 controlled by solenoids 29A, 29B, respectively. The end 51 is attached to the grating fiber as through support 15. Depending on the polarity and magnitude of the induced and latched magnetization in the two programmable magnets, the position of the spring and hence the strain in the fiber grating is determined. The device can operate either in a bistable, or multi-stable wavelength-shifting mode or in a continuously wavelength-tunable mode.

In the FIG. 5(c) embodiment, the programmable magnet 27 is fixed onto one side of the support frame 14, and the movable magnet 26 with the fiber grating bonded onto it is attached to the other side of the support frame 14. The movable magnet 26 is magnetically attracted or repelled by the magnetic pole of the programmable magnet 27 depending on the polarity and magnitude of magnetization. If the movable magnet 26 is made of a soft magnetic material instead of a permanent magnet material, a retractive force can be provided by using a spring 50. This device can also operate in a bistable, multi-stable or continuously wavelength-tunable mode.

Figure 6A:
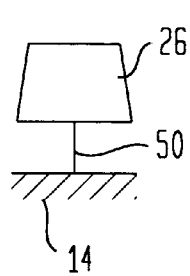
FIGS. 6(a)–(c) show alternative configurations of the movable magnet.
Figure 6B:
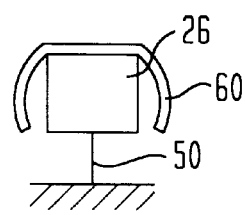
Figure 6C:
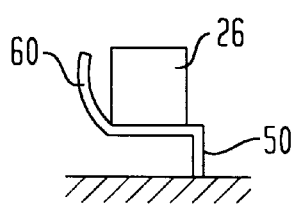

FIGS. 6(a)–6(c) show alternative configurations of the movable magnet 26 for the FIG. 5(c) device. A solid magnet 26 can be used alone, as shown in FIG. 6(a) or it can be combined with a collapsible spring 60 to provide a fine wavelength-tuning (tweaking) capability. Such a tweaking capability is particularly useful for a bistable mode device in which only two stable positions and hence only two stable wavelength states are available. In a real-life situation, unavoidable variations in device dimensions, assembly procedures, component materials and pre-straining in the fiber grating, may cause deviations in the base-wavelength ($\lambda_o$) of the grating as well as the intended amount of the wavelength shift ($\Delta\lambda$). A post-assembly correction or tweaking of $\lambda_o$ and $\Delta\lambda$ is often desirable. This can be conveniently accomplished by increasing the programmable magnet force, thereby inducing additional deformation of spring spring 60.

Figure 7:
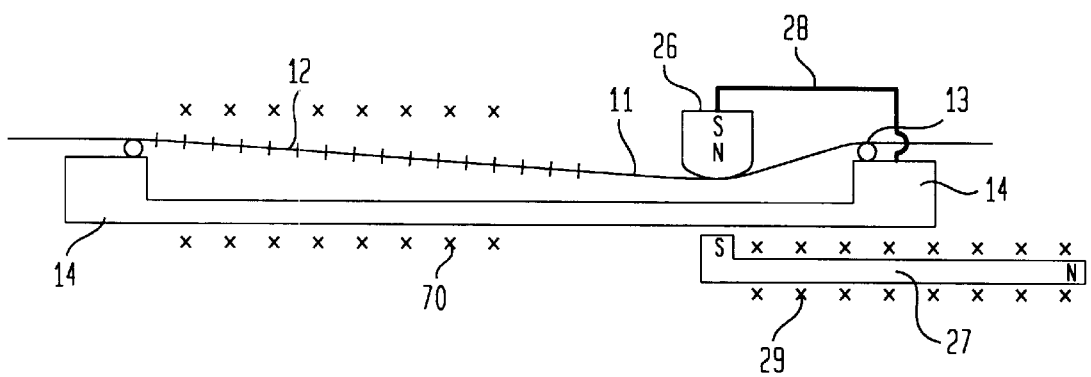
FIGS. 7 and 8 illustrate wavelength-tunable grating devices which can be post-assembly-weaked by using magnetostriction and mechanical adjustment, respectively.

FIG. 7 shows an embodiment similar to that of FIG. 1(b) except that support frame 14 is made of magnetostrictive material and a second solenoid 70 is provided for varying the length of frane 14, thus tweeking $\lambda_0$ or $\Delta\lambda$ (or both). In positive magnetostrictive materials such as Fe, Co and their alloys, the magnetization causes the length to increase, while the opposite happens in negative magnetostrictive materials such as Ni and some of its alloys. The magnitude of magnetostriction is typically 10–1000×33 $10^{-6}$, and the remanent (or latchable) magnetostriction-induced length change of $20\times10^{-6}$ inch/inch in a fiber grating of 1500 nm would produce about 30 picometers shift in $\lambda_0$, a reasonably fine control capability.

Figure 8:
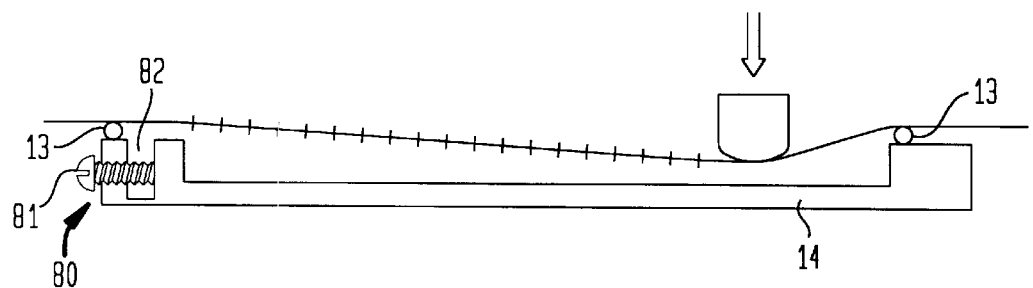

FIG. 8 shows an embodiment similar to that of FIG. 1(a) including on the frame 14 a mechanical wavelength adjusting mechanism 80 using a screw 81 to vary the length of the frame and thus tweak the strain on the grating 12. Instead of a screw, one could insert spacers with known thickners into the slot 82 to induce a similar fine wavelength-adjustment.

The tunable gratings are not restricted to bistable or continuously tunable devices. A tri-stable or higher-order digital tuning is also possible by adding additional moving bodies or movable magnets in the devices of FIG. 1 or FIG. 5.

The gratings described herein are especially useful in wavelength division multiplexed communication systems (WDM systems) which employ multiplexer/demultiplexer devices. In WDM systems, a "trunk" fiber carries optical signal channels at several wavelengths $\lambda_1, \lambda_2, \ldots \lambda_n$ and it is desirable to extract a single wavelength channel from the trunk fiber or to add a single wavelength channel onto the trunk. A wide variety of such devices can be made by interconnecting optical circulators and fiber gratings. Typically the channel reflected by the grating is dropped to the trunk fiber or is added to the trunk. Gratings as described herein permit selection at the grating of which channel is dropped or added.

Figure 9:
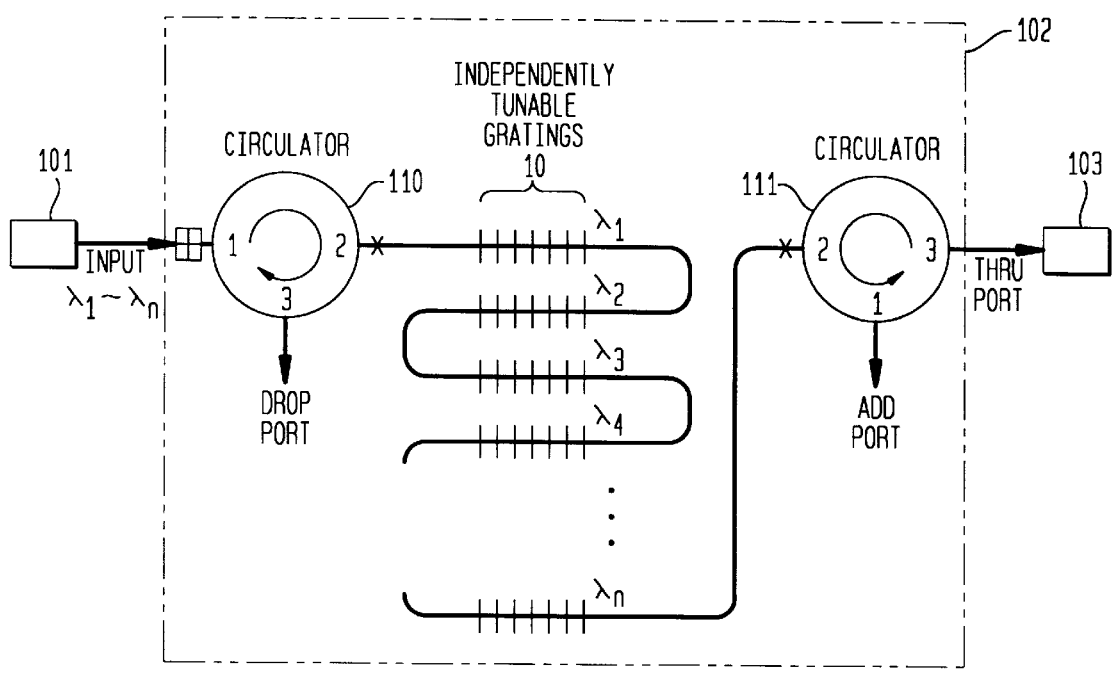
FIG. 9 shows an N channel ADD/DROP WDM communication system using one or more tunable gratings.

FIG. 9 schematically illustrates an improved WDM communication system comprising a transmitter 101, an improved ADD/DROP multiplexer/demultiplexer 102 and a receiver 103, all connected by trunk fiber 11. The input on fiber 11 consists of optical signals at several wavelengths, $\lambda_1$ to $\lambda_n$.

The improved ADD/DROP devices 102 comprises one or more pairs (here 1 pair) of circulators, comprising an upstream circulator 110 and a downstream circulator 111. A series of bistable tunable gratings 10 as described herein are placed between the circulators, with their grating wavelengths located at between-channel wavelengths. Actuation of desired grating for one-half channel shift in wavelength drops or adds the adjacent communication channel.

If a certain selected group of channels needs to be dropped (or filtered), the magnetic tuning devices for those gratings are activated by a magnetic pulse field so as to strain the fiber gratings by ½ channel, e.g., $\Delta\lambda/\lambda$ of roughly 0.4 nm/1550 nm ≈0.025%. To cancel the DROP operation of a channel, reverse-polarity magnetic field (or a demagnetizing field) is applied to the magnet element to switch to the other stable position and shift back the wavelength by ½ channel. The ADD operation is performed in a similar manner but with a backward transmission through a circulator and Bragg reflection in the forward direction.

The magnetically switchable fiber grating assembly also provides advantages for a variety of additional optical fiber communication devices and communication operation systems. For example, a chirped Bragg grating (e.g., with a gradient periodicity covering $\lambda_1$ through $\lambda_4$ along the length of one grating, or with the four distinct grating structures Written in series in one grating length) can be made magnetically switchable between two strain position. In this case, the four channels are dropped or added simultaneously as a group. A plurality of chirped gratings can be connected so that the group-wise ADD/DROP operation of channels can be performed covering a wider bandwidth.

Figure 10:
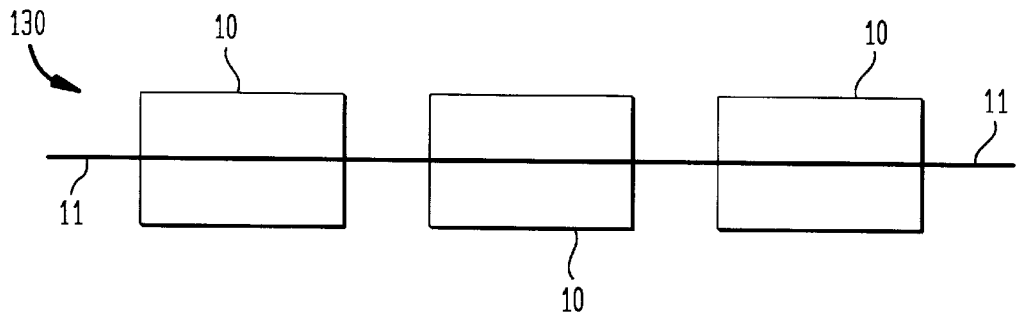
FIG. 10 schematically illustrates a wide band tunable loss filter using one or more tunable gratings.

The tunable grating structure can also be applied to the long-period gratings for gain adjustment. As schematically illustrated in FIG. 10 a tunable loss filter 130 covering a wider bandwidth than a single long-period grating device can be constructed by concatenating a plurality of magnetically tunable long-period gratings 10 along a single fiber 11. A desired loss spectrum can be obtained by selectively activating the gratings with certain $\Delta\lambda$ shift capability.

Long-period gratings for flattening the response of an amplifier are described, for example, in U.S. Pat. No. 5,430,817 issued to A. M. Vengsarkar on Jul. 4, 1995, which is incorporated herein by reference.

Figure 11:
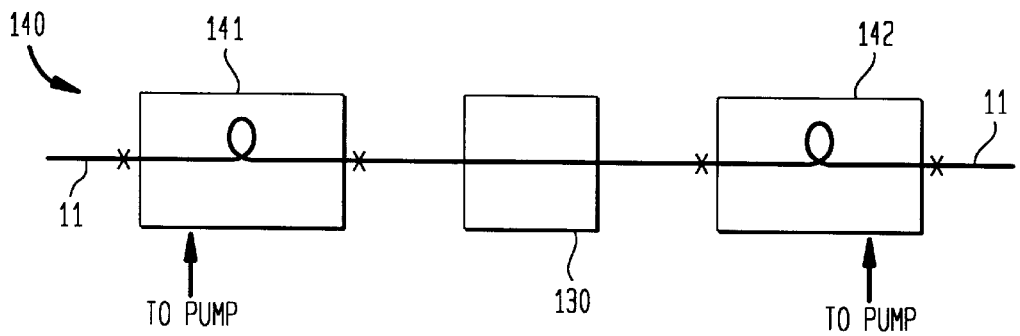
FIG. 11 shows a dynamically gain-flattened optical amplifier which can employ the loss filter of FIG. 10.

FIG. 11 illustrates a dynamically gain-flattened amplifier 140 made by including a tunable loss filter 130 composed of the tunable long-period gratings in a rare earth doped amplifier (such as an erbium-doped fiber amplifier). The amplifier 140 preferably comprises a plurality of rare-earth fiber amplifier stages (e.g. two stages 141 and 142) with the tunable loss filter 130 preferably disposed at the output of the first stage. This gives the highest power and the lowest noise figure. For applications where noise is less important, the filter 130 can be placed in front of the first stage 141. For applications where power is less important, it can be placed at the output of the last stage 142. Such devices 140 can be advantageously used in WDM optical communication systems to ensure equalized amplification under a wide variety of conditions.

Figure 12:
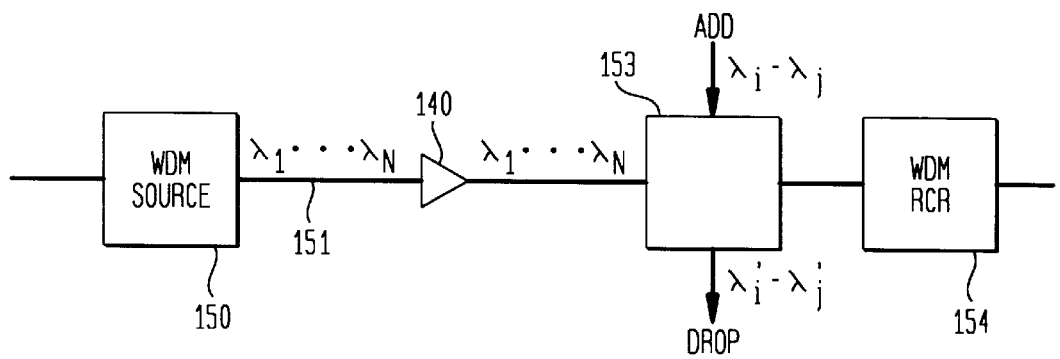
FIG. 12 schematically illustrates an optical WDM communication system which can employ the ADD/DROP device of FIG. 9 and the gain-flattened amplifier of FIG. 11.

FIG. 12 schematically illustrates an optical WDM communication system comprising a source 150 of modulated WDM optical signal channels $\lambda_1, \lambda_2, \ldots \lambda_n$ along a trunk fiber 151. The channels pass through one or more gain equalized amplifiers 140, which can be gain flattened amplifiers as shown in FIG. 11, and through one or more ADD/DROP devices 153, which can be ADD/DROP devices as shown in FIG. 9.

It is to be understood that the above-described embodiments are illustrative of only a few of the many possible specific embodiments which can represent applications of the invention. The magnetically or mechanically switchable and latchable devices described here are also useful for making various other types of non-fiber optical gratings for the purpose of reconfiguring or tuning either wavelength, amplitude or phase of optical information. For example, slitted gratings, transmission-type or reflection-type grooved gratings, or phase gratings can be made magnetically tunable for various optical applications such as for producing fresnel lenses, holographic images, and optical memory devices. Numerous and varied other arrangements can be made by those skilled in the art without departing from the spirit and scope of the invention.

What is claimed:

1. A wavelength-tunable grating device comprising:

a support frame for supporting a body of material;

a body of material including an optical grating, the body attached to the support frame on opposite sides of the grating; and a movable body for pushing of pulling laterally on the body or material to elastically flex the body and induce a tensile strain therein, thereby altering the resonant resonant wavelength of the grating.

2. The device of claim 1 wherein the movable body is magnetic and including a programmable magnet for moving the magnetic movable body.

3. The device of claim 2 wherein the programmable magnet is latchable.

4. The device of claim 3 wherein the magnetization latching of the programmable magnet after the applied field is removed, is at least 80% of the magnetization when the field is on.

5. The device of claim 1 wherein said body comprises a length of optical waveguide.

6. The device of to claim 5 wherein said grating is a long-period grating.

7. The device of claim 1 including means for mechanically moving the movable body.

8. The device of claim 1 wherein said movable body is latchable.

9. The device of claim 1 including means for magnetically moving the movable body.

10. The device of claim 1 wherein the said device is bistable with a switching capability between two strain states.

11. The device of claim 1 wherein said grating is a Bragg grating.

12. A device of to claim 1 wherein said grating is a diffraction grating.

13. The device of claim 1 wherein the movable body includes an elastically deformable surface.

14. The device of claim 1 wherein said body comprises an optical fiber.

15. The grating device of claim 1 wherein said grating is chirped grating.

16. The device according to claim 1 including a tweaking mechanism for adjusting the wavelength of the grating after fabrication.

17. An optical multiplexer/demultiplexer comprising an optical grating device according to claim 1.

18. An optical waveguide amplifier comprising a long period optical grating device according to claim 1.

* * * * *